UNITED STATES PATENT OFFICE.

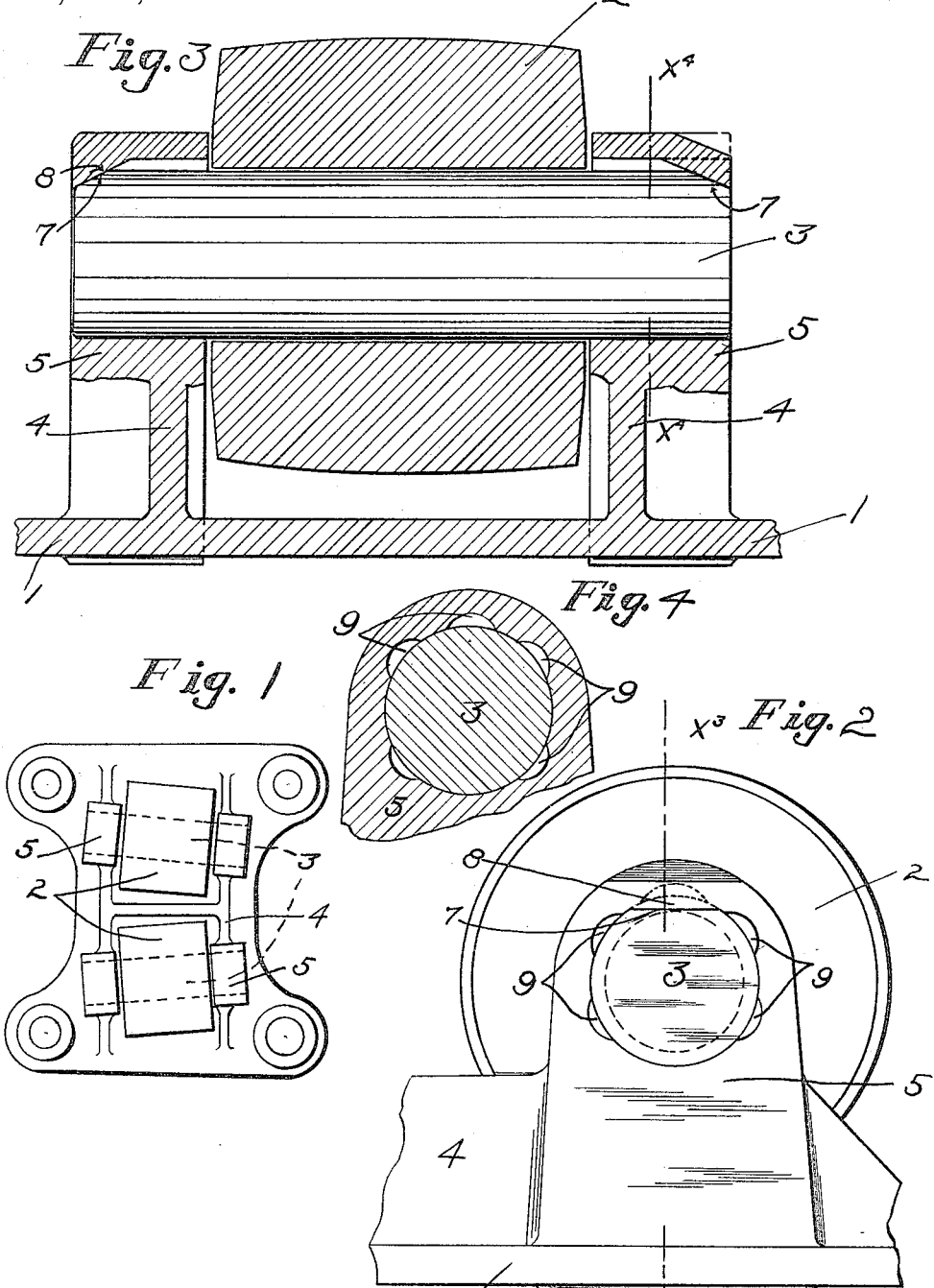

FRANKLIN L. BARBER AND EDWIN W. WEBB, OF CHICAGO, ILLINOIS, ASSIGNORS TO STANDARD CAR TRUCK COMPANY, OF CHICAGO, ILLINOIS, A CORPORATION OF NEW JERSEY.

SIDE BEARING.

1,214,118.  Specification of Letters Patent.  Patented Jan. 30, 1917.

Application filed October 22, 1915. Serial No. 57,250.

*To all whom it may concern:*

Be it known that we, FRANKLIN L. BARBER and EDWIN W. WEBB, citizens of the United States, residing at Chicago, in the county of Cook and State of Illinois, have invented certain new and useful Improvements in Side Bearings; and we do hereby declare the following to be a full, clear, and exact description of the invention, such as will enable others skilled in the art to which it appertains to make and use the same.

Our invention has for its object to provide an improved roller bearing especially adapted for use as a side bearing for railway cars; and to such ends, generally stated, the invention consists of the novel devices and combinations of devices hereinafter described and defined in the claims.

In the accompanying drawings which illustrate the invention, like characters indicate like parts throughout the several views.

Referring to the drawings: Figure 1 is a plan view showing the improved bearing designed as a side bearing for cars; Fig. 2 is a side elevation of the bearing, some parts broken away; Fig. 3 is a vertical section taken on the line $x^3$ $x^3$ of Fig. 2, some parts being left in full; and Fig. 4 is a detail in section on the line $x^4$ $x^4$ of Fig. 3.

The bearing comprises a casting 1, rollers 2 and axles 3. The casting 1 is preferably of malleable iron or cast steel, and it is formed with flanged lugs 4 that have axially alined axle seats 5. The inner and outer axle seats are alined in pairs with the axes converging toward the pivotal connection (not shown) between the truck and the car body.

It is desirable that the axles be held against rotation and it is also desirable that this be accomplished at a small cost. It is also desirable that the axles be hardened so that they will wear a long time. For accomplishing these results, the axles, at their ends, are cut away, preferably on oblique or beveled lines indicated at 7, and the axle seats are formed with corresponding beveled lug surfaces 8. One of these so-called lug surfaces 8 may be cast in final form, but the other must be formed by swaging the outer edge of the top of the seat downward onto the coöperating surface 7 after the pin has been driven to working position. For example, in Fig. 3, at the right, this swaged lug surface is shown by full lines and the normal position of the metal which forms the same is indicated by dotted lines. In the normal or dotted line position, the axle may, of course, be driven through the right hand seat.

The axles are driven through the seats 5 under such tight fit that they will coöperate as a cutting tool to cut away portions of the interiors of the seats; and to reduce the amount of metal necessarily cut away by the axles in the driving action, the said seats are preferably formed at various points with longitudinally extended internal clearance grooves 9. The extreme bottom portions of the seats 5 are left intact and the clearance grooves 9 are spaced so that limited contact between the axles and seats is left at the side and upper portions of the seat. Obviously, axles inserted under driving force, as above described, and then engaged by the lug surfaces 8 will not only be held firmly against rotation but will also be held against axial or endwise displacement.

A bearing, such as described, has been found highly efficient as a side bearing for cars. It is of comparatively cheap construction and at the same time, very strong and durable.

What I claim is:

1. In a bearing, the combination with a base member having laterally spaced lugs with axially alined seats, of an axle mounted in said seats, and a roller journaled on the axle, one of said seats having a lug surface for limiting the endwise movement of the axle in one direction, the other of said seats having a longitudinally extended clearance groove and the adjacent end of said axle having a reduced portion onto which the seat, overlying the outer end portion of said groove, is swaged.

2. In a bearing, the combination with a base member having laterally spaced lugs with axially alined axle seats, the said axle seats having circumferentially spaced longitudinally extended clearance grooves, of an axle fitting said grooved seats with a driving fit and having at its ends reduced portions, and a roller journaled on the axle, one of said seats having a lug surface engaging the reduced portion of the adjacent end of the axle for holding the axle against rotation and endwise movement in one direction, the seat at the other end of the axle, overlying the outer end of one of said grooves, being swaged inward onto the underlying reduced portion of the axle.

3. In a bearing, the combination with a cast base having laterally spaced lugs with axially alined axle seats, the said axle seats having circumferentially spaced longitudinally extended clearance grooves, of an axle fitting the said grooved seats with a driving fit, and a roller journaled on said axle.

4. In a bearing, the combination with a cast base having laterally spaced lugs with axially alined axle seats, the said axle seats having circumferentially spaced longitudinally extended clearance grooves, of an axle fitting the said grooved seats with a driving fit, and a roller journaled on said axle, the said axle having beveled end portions and the said seats having lug surfaces engaging the said beveled end surfaces and holding the said axle both against rotation and endwise displacement.

In testimony whereof we affix our signatures in presence of two witnesses.

FRANKLIN L. BARBER.
EDWIN W. WEBB.

Witnesses:
CHAS. S. WALTON,
ROY ANDERSON.

Copies of this patent may be obtained for five cents each, by addressing the "Commissioner of Patents, Washington, D. C."